US008681849B2

United States Patent
Taubin et al.

(10) Patent No.: US 8,681,849 B2
(45) Date of Patent: Mar. 25, 2014

(54) PRECODER CONSTRUCTION AND EQUALIZATION

(75) Inventors: Felix Aleksandrovich Taubin, St. Petersburg (RU); Sergey Valentinovich Bulatnov, Leningradskaya OBL (RU)

(73) Assignee: Intel Corporation, Santa Clara, CA (US)

( * ) Notice: Subject to any disclaimer, the term of this patent is extended or adjusted under 35 U.S.C. 154(b) by 1174 days.

(21) Appl. No.: 11/988,148

(22) PCT Filed: Jun. 29, 2005

(86) PCT No.: PCT/RU2005/000359
§ 371 (c)(1),
(2), (4) Date: Feb. 12, 2010

(87) PCT Pub. No.: WO2007/001205
PCT Pub. Date: Jan. 4, 2007

(65) Prior Publication Data
US 2010/0226422 A1 Sep. 9, 2010

(51) Int. Cl.
*H03H 7/30* (2006.01)
*H03H 7/40* (2006.01)
*H03K 5/159* (2006.01)

(52) U.S. Cl.
USPC ........... 375/231; 375/232; 375/233; 375/257; 375/258; 375/296

(58) Field of Classification Search
USPC .................. 375/231, 232, 233, 257, 258, 296
See application file for complete search history.

(56) References Cited

U.S. PATENT DOCUMENTS

| | | | | |
|---|---|---|---|---|
| 5,053,870 A | * | 10/1991 | Ito et al. | 348/614 |
| 5,408,500 A | * | 4/1995 | Ginzburg et al. | 375/288 |
| 5,559,561 A | * | 9/1996 | Wei | 348/470 |
| 5,852,630 A | * | 12/1998 | Langberg et al. | 375/219 |
| 6,012,161 A | * | 1/2000 | Ariyavisitakul et al. | 714/795 |
| 6,243,425 B1 | * | 6/2001 | Langberg et al. | 375/285 |
| 6,324,220 B1 | * | 11/2001 | Sellars | 375/296 |
| 6,393,029 B1 | * | 5/2002 | Turner et al. | 370/419 |
| 6,680,978 B1 | * | 1/2004 | Schneider et al. | 375/242 |
| 6,732,315 B2 | | 5/2004 | Yagil et al. | |

(Continued)

FOREIGN PATENT DOCUMENTS

| | | |
|---|---|---|
| EP | 1420556 A2 | 5/2004 |
| WO | WO-9837671 A | 8/1998 |

(Continued)

OTHER PUBLICATIONS

Powell, S., "Precoder Based 10GBASE-T Architecture Proposal", Mar. 2004, Broadcom, IEEE P802.3an.*

(Continued)

*Primary Examiner* — Shuwang Liu
*Assistant Examiner* — Sung Ahn
(74) *Attorney, Agent, or Firm* — Schwegman, Lundberg & Woessner, P.A.

(57) ABSTRACT

Apparatus and methods are provided to construct parameters associated with a precoder to a channel. Embodiments include apparatus and methods to apply a maximum a posteriori probability (MAP) equalization using offsets of signals introduced at a transmit end of a channel. Embodiments include apparatus and methods to construct a channel precoder based on using approximation of channel responses for a range of channel lengths.

4 Claims, 5 Drawing Sheets

(56) References Cited

U.S. PATENT DOCUMENTS

| | | | |
|---|---|---|---|
| 6,862,326 | B1* | 3/2005 | Eran et al. .................. 375/343 |
| 6,928,047 | B1 | 8/2005 | Xia |
| 6,928,107 | B1* | 8/2005 | Olafsson et al. ............ 375/219 |
| 7,012,957 | B2* | 3/2006 | Allpress et al. ............. 375/233 |
| 7,242,724 | B2 | 7/2007 | Alexiou et al. |
| 7,257,181 | B2* | 8/2007 | Jones et al. ................. 375/350 |
| 7,486,739 | B2 | 2/2009 | Hottinen et al. |
| 7,512,191 | B2* | 3/2009 | Laamanen et al. .......... 375/296 |
| 7,616,701 | B2* | 11/2009 | Ungerboeck ................ 375/295 |
| 7,986,744 | B2 | 7/2011 | Efimov et al. |
| 2002/0186763 | A1* | 12/2002 | Kennedy et al. ............ 375/232 |
| 2003/0091111 | A1* | 5/2003 | Vaananen .................... 375/231 |
| 2003/0123569 | A1* | 7/2003 | McLaughlin ................ 375/296 |
| 2003/0185310 | A1 | 10/2003 | Ketchum et al. |
| 2003/0189976 | A1* | 10/2003 | Modlin ........................ 375/222 |
| 2004/0028155 | A1 | 2/2004 | Domstetter et al. |
| 2004/0233981 | A1* | 11/2004 | Porter et al. ................. 375/229 |
| 2007/0014345 | A1* | 1/2007 | Gu et al. ..................... 375/232 |
| 2009/0274239 | A1 | 11/2009 | Efimov et al. |
| 2010/0150264 | A1 | 6/2010 | Taubin et al. |

FOREIGN PATENT DOCUMENTS

| | | |
|---|---|---|
| WO | WO-9837671 A1 | 8/1998 |
| WO | WO-2006073326 | 7/2006 |
| WO | WO-2006073326 A1 | 7/2006 |
| WO | WO-2007037715 A1 | 4/2007 |

OTHER PUBLICATIONS

Powell, S., "10GBASE-T PAM Scheme: Proposed Overll Architecture", Jul. 2004, IEEE P802.3an.*

Powell, S., "800MBaud PHY for 10GBase-T", Sep. 2004, IEEE P802.3an Task Force.*

U.S. Appl. No. 11/794,593 Non-Final Office Action mailed Oct. 18, 2010, 26 pgs.

U.S. Appl. No. 11/794,593 Notice of Allowance mailed Mar. 18, 2011, 11 pgs.

U.S. Appl. No. 11/794,593, Response filed Jan. 18, 2011 to Non Final Office Action mailed Oct. 18, 2010, 19 pgs.

U.S. Appl. No. 11/992,784, Non Final Office Action mailed Dec. 14, 2010, 9 pgs.

U.S. Appl. No. 11/992,784, Notice of Allowance mailed Jun. 3, 2011, 8 pgs.

U.S. Appl. No. 11/992,784, Response filed Mar. 14, 2011 to Non Final Office Action mailed Dec. 14, 2010, 12 pgs.

German Application Serial No. 112005003577.8-31, Office Action mailed Jun. 3, 2011, 10 pgs.

International Application Serial No. PCT/RU2005/000359, International Search Report and Written Opinion, mailed May 19, 2006, 7 pgs.

Li, Y. , et al., "Optimum soft-output detection for channels with intersymbol interference", *IEEE Transactions on Information Theory*, 41(3), (May 1995),704-713.

Vareljian, Albert , "Fixed Set FIR Transfer Functions for 10GBASE-T THP", *IEEE P802.3an Task Force Meeting*, (Jan. 20, 2005),1-7.

Al-Dhahir, N , "Stable pole-zero modeling of long FIR filters with application to the MMSE-DFE", *IEEE Transactions on Communications*, 45(5), (May 1997),508-513.

Brown, C. , et al., "Effects of Training Sequence Length and Precoder Update Duration over a Fading Channel in the MMDS Band", *Personal, Indoor and Mobile Radio Communications*, 1, (Sep. 18, 2000),595-598.

Burrus, C , "Time domain design of recursive digital filters", *IEEE Transactions on Audio and Electroacoustics*, 18(2), (Jun. 1970),137-141.

Evans, A , "Optimal least squares time-domain synthesis of recursive digital filters", *IEEE Transactions on Audio and Electroacoustics*, 21(1), (Feb. 1973),61-65.

Forney, G. D., "Maximum-Likelihood Sequence Estimation of Digital Sequences in the Presence of Intersymbol Interference", *IEEE Transactions on Information Theory, IEEE Service Center*, vol. IT-18, No. 3 (May 1, 1972),363-378.

Li, Funxin , et al., "Optimum soft-output detection for channels with intersymbol interference", *IEEE Transactions on Information Theory*, 41(3), (May 1995),704-713.

Mertins, A. , "Design of Filterbank Transceivers for Dispersive Channels with Arbitrary-Length Impulse Response", *Journal of telecommunications and Information technology,*, (Feb. 2003),11-16.

Mertins, A. , "Design of Redundant FIR Precoders for Arbitrary Channel Lengths Based on an MMSE Criterion", *ICC 2002, International conf. on communications*, 1 of 5, (Apr. 28, 2002),212-216.

Mertins, A. , "MMSE Design of Redundant FIR Precoders for Arbitrary Channel Lengths", 51(9), (Sep. 2003),2402-2405.

Proakis, John G., "Digital Communications", *New York : McGraw-Hill*, 4th ed., (2000),598-658.

Shaw, A , "An optimal method for identification of pole-zero transfer functions", *IEEE International Symposium on Circuits and Systems, ISCAS '92. Proceedings*, vol. 5, (May 3-6, 1992),2409-2412.

Tu, Jerome C., "Theory, design and application of multichannel modulation for digital communications", *PhD Thesis—Stanford University*, (1991),1-234.

Ungerboeck, Gottfried , "10GBASE-T Modulation & Coding, Set of Fixed Precoders, and Start-up", *IEEE P802.3an Task Force Meeting*, (Nov. 2004),1-29.

Ungerboeck, Gottfried , "10GBASE-T PAM Scheme: Fixed Precoder for all Cable Types and Lengths", *IEEE P802.3an Task Force Meeting*, (Jul. 2004),1-27.

* cited by examiner

PRECODER CONSTRUCTION AND EQUALIZATION

RELATED APPLICATIONS

This application is related to the following, co-pending, commonly assigned application: PCT Application no. PCT/RU2004/000538, entitled: "PRESCRIBED RESPONSE PRECODING FOR CHANNELS WITH INTERSYMBOL INTERFERENCE," filed 30 Dec. 2004.

TECHNICAL FIELD

Embodiments of the invention relate generally to precoders for communication channels.

BACKGROUND

Channels in a communication network may typically experience channel distortion. This channel distortion may result in intersymbol interference (ISI), which essentially is the spreading of a signal pulse outside its allocated time interval causing interference with adjacent pulses. If a communication channel is uncompensated with respect to its intersymbol interference, high error rates may result. Various methods and designs are used for compensating or reducing intersymbol interference in a signal received from a communication channel. The compensators for such intersymbol interference are known as equalizers. Various equalization methods include maximum-likelihood (ML) sequence detection, linear filters with adjustable coefficients, and decision-feedback equalization (DFE).

Linear and DFE equalizers at the receiver end of a communication system are generally accompanied with increased noise characteristics. The increased noise characteristics may be reduced with an equalizer placed at the transmitter end. Such a design relies on the channel response being a known factor to the transmitter. Since channel characteristics may vary with time, design of the complete equalizer at the transmitter end is not straight forward. However, the channel characteristics do not vary significantly over time in wire line channels. This lack of time variation allows for a DFE feedback filter to be placed at the transmitter and a DFE feedforward filter at the receiver. However, using such a DFE design may result in the signal points at the transmitter, after subtracting intersymbol interference, having a larger dynamic range than the original set of signals, thus requiring larger transmitter power. The problems associated with increased required power may be addressed with precoding information symbols prior to transmission. However, to provide higher speed reliable data communication what is needed are enhanced schemes for providing channel equalization, which at the same time can be implemented without a significant amount of complexity.

DETAILED DESCRIPTION

Figure 1:
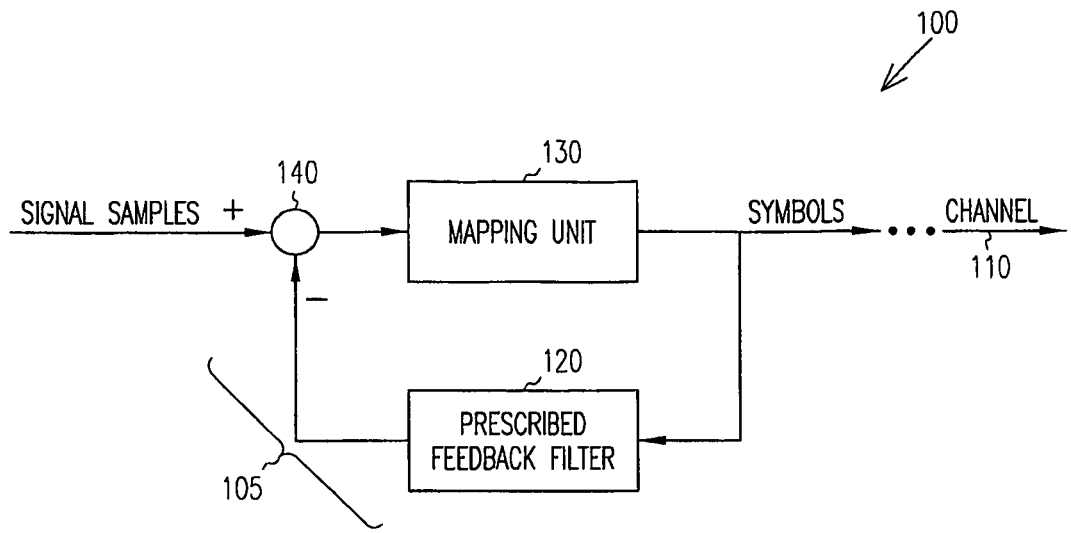
FIG. 1 illustrates a block diagram of an embodiment of an apparatus having a precoder including a mapping unit and a prescribed feedback filter, where the prescribed feedback filter provides a modified filter to enhance system channel response.

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

In an embodiment, parameters associated with a precoder to a channel are constructed. A construction may include applying a maximum a posteriori probability (MAP) equalization using offsets of signals introduced at a transmit end of the channel. In an embodiment, a MAP equalization may be adapted to use offsets of signals introduced at a transmit end to the channel in conjunction with an equivalent impulse response of the channel. A construction may include constructing a channel precoder based approximation of channel responses for a range of channel lengths. In an embodiment, a channel precoder may be implemented as an average precoder, with the implementation based on using approximation of channel responses for the range of channel lengths. The average precoder may be constructed by generating an average feedback filter at a transmit end of the channel. In an embodiment, a construction may include constructing a channel precoder based on using approximation of channel responses for a range of channel lengths, where a MAP equalization adapted to use offsets of signals introduced at a transmit end to the channel is implemented at a receive end of the channel.

In an embodiment, MAP equalization with modular offset prediction may be applied jointly with a modified Tomlinson-Harashima precoder, where such a modified Tomlinson-Harashima precoder provides a prescribed response to a communication channel. Such offset prediction is modular in the sense that it is obtained by applying a modulo operation. A standard approach to precoding is use a precoder for intersymbol interference cancellation such that the ISI is completely removed. However, in an embodiment, ISI may be used to increase a signal-to-noise ratio, SNR, at a receiver. An embodiment of a modified Tomlinson-Harashima precoder, for example as in PCT Application no. PCT/RU2004/000538, entitled: "Prescribed Response Precoding for Channels with Intersymbol Interference," provides the ability to consider the whole transmission channel as a channel with a very short channel response and the ability to use enhanced signal detection. An embodiment of a MAP equalization with modular offset prediction may address the modula reduction procedure and constellation propagation effect at the receiver after post-processing of the precoder that may accompany an embodiment of a modified Tomlinson-Harashima precoder.

An embodiment of a precoder to provide a prescribed response, which may be used with an embodiment of a MAP equalization with modular offset prediction, provides increased gain at a receiving end of a communication channel by modifying a precoder filter designed to completely reduce intersymbol interference such that a signal passing through the modified precoder filter experiences a quantity of ISI in transmission to the receiving end. By appropriately selecting the modification to the precoder filter, the amount of ISI may be controlled.

FIG. 1 illustrates a block diagram of an embodiment of an apparatus 100 having a precoder 105 including a mapping unit 130 and a prescribed feedback filter 120, where prescribed feedback filter 120 provides a modified filter to enhance system channel response. Precoder 105 couples to a channel 110 and provides precoding of signal samples for transmission in channel 110. Prescribed feedback filter 120 is coupled to mapping unit 130 through summer 140. Apparatus 100 includes various elements in addition to precoder 105 for transmission of signal samples on communication channel 110, where a portion of these elements may be considered as coupling precoder 105 to channel 110. Such communication elements are known to those skilled in the art and are not known shown in an effort to focus on apparatus that include embodiments for a prescribed feedback filter to enhance overall system channel response associated with information transmission in a communication channel.

A mapping unit maps a set of signal samples to a set of symbols according to set of rules that may place a bound on the amplitude to the symbol to be transmitted in channel 110. Mapping unit 130 may be realized as a unit that performs a modulo operation. A modulo operation on an entity with respect to some basis unit returns a remainder from the division operation of the entity by the basis unit. In an embodiment, a prescribed feedback filter may be realized as a modification of a standard precoding feedback filter, where the standard precoding feedback filter is designed for a precoder that is used to effectively provide complete compensation of ISI for a communication channel. Prescribed feedback filter 120 may modify a standard precoding feedback filter such that instead of complete equalization, channel interference is allowed. Such embodiments allow the implementation of an embodiment of a maximum a posteriori probability (MAP) detection scheme in the receiver after equalization to increase the system gain with respect to the channel transmission.

Figure 2:
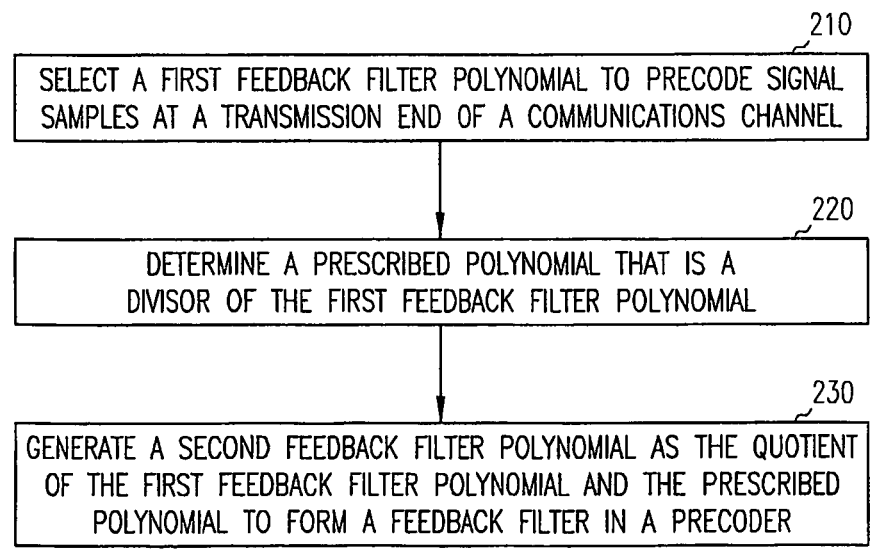
FIG. 2 illustrates an embodiment of features of a method for providing modified precoding to enhance system response.

FIG. 2 illustrates an embodiment of an embodiment of a method for providing modified precoding to enhance system response. At 210, a feedback filter polynomial to precode signal samples at a transmission end of a communication channel is selected. The feedback filter polynomial may be selected as a polynomial associated with a precoder in an arrangement to completely compensate for ISI in the communication channel. At 220, a target polynomial that is a divisor of the selected feedback filter polynomial is determined. In an embodiment, a divisor polynomial having the lowest non-zero degree is selected. At 230, a second feedback polynomial is generated as the quotient of the selected feedback filter polynomial divided by the target polynomial. The second feedback polynomial may be used to form a prescribed feedback filter in a precoder. The second feedback polynomial may be generated to control intersymbol interference. Control of intersymbol interference may include allowing some interference into the communication channel to allow an increase of system gain associated with the transmitting end, the communication channel, and the receiving end.

In an embodiment, a precoding scheme includes generating a prescribed response precoding scheme from a Tomlinson-Harashima precoder (THP) arrangement. The feedback filter for a THP arrangement may be determined for a given communication channel. The feedback filter may be determined as a feedback filter polynomial denoted as $B(z)=1+b_1 z^{-1}+b_2 z^{-2}+\ldots+b_n z^{-n}$, where $b_i$ are filter coefficients and n is the filter length. The polynomial B(z) may be determined using techniques to eliminate ISI in the given communication channel that are known to those skilled in the art. As an example, consider a process for coefficient optimization of decision-feedback equalizer (DFE) having a feedback filter and a feedforward filter, each with taps spaced at the symbol interval. Input to the feedforward section may be represented by a received signal sequence $\{v_k\}$. Further, the feedback filter is functionally implemented to remove that part of the ISI from a present estimate caused by previously detected symbols. The equalizer, having (K1+1) taps in the feedforward filter and K2 taps in the feedback filter, may have an output that can be represented as $$I^+_k = \Sigma^0_{j=-K1}(c_j v_{k-j}) + \Sigma^{K2}_{j=1}(c_j I^-_{k-j})$$

where $I^+_k$ is an estimate of the $k^{th}$ information symbol, $\{c_j\}$ are tap coefficients for the filters, and $\{I^-_{k-1}, \ldots, I^-_{k-K2}\}$ are previously detected symbols. With previously detected symbols in the feedback filter taken as correct, the minimization of the mean square value of the error (MSE) leads to a set of equations for the coefficients of the feedforward filter:

$$\Sigma^0_{j=-K1}\psi_{1j}c_j = f^*_{-1},\ 1=-K1,\ldots,-1, 0$$

where, $\psi_{1j}=\Sigma^{-1}_{m=0} f^*_m f_{m+1-j} + N_0 \delta_{1j},\ 1, j=-K1,\ldots,-1. 0$, and $N_0$ is a noise spectral density factor. The coefficients of the feedback filter can be derived from the coefficients of the feedforward section as $$c_k = -\Sigma^0_{j=-K1}(c_j f_{k-j}),\ k=1, 2,\ldots, K2.$$

This coefficient determination is known to those skilled in the Art. See, for example J. Proakis, Digital Communications, pages 621-622, McGraw Hill, 1995. These coefficients may be used as the coefficients $b_i$ of B(z). Under the assumption that K2≥L, where L is the number of symbols affected by intersymbol interference, intersymbol interference may be eliminated. In a Tomlinson-Harashima precoding arrangement, the feedback filter is at the transmitting end and the feedforward filter is at the receiving end.

In an embodiment, a modified feedback filter polynomial, such as a polynomial for prescribed feedback filter 120 of FIG. 1, can be computed as:

$$B^*(z) = B(z)/F(z),$$

where B(z) denotes a standard feedback filter polynomial and F(z) is a target polynomial of a small power such that F(z) is the divisor of feedback polynomial B(z). Since F(z) is a divisor of feedback filter polynomial B(z), all the roots (z, where F(z)=0) of F(z) are also roots of feedback filter polynomial B(z). To prevent instability in a feedback filter, all roots of this filter should be inside the unit circle, in other words, the absolute value of the roots, $r_i$, should be less then 1, abs($r_i$)<1. There are many possible choices of the roots for F(z) polynomial construction, but some combinations of roots may provide better performance than others. Namely, the roots of polynomial F(z) should be selected in such a way as to maximize the effective signal-to-noise ratio (SNR) at the output of a feedforward filter in a receiver, such as feedforward filter 360 in FIG. 3. The effective SNR substantially determines the performance transmission over channels with intersymbol interference. See, G. D. Formey Jr., "Maximum-likelihood sequence estimation of digital sequences in the presence of intersymbol interference," IEEE Trans. Info. Theory, vol. IT-18, pp. 363-378, May 1972. Such a feedforward filter need not be modified in various embodiments for prescribed response precoding scheme. One approach to select the best results may be to perform a thorough search through the all roots of feedback polynomial B(z).

The coefficients of standard feedback polynomial B(z) may be determined in a number of conventional manners. For a wire line network in which the transmit end, the receiving end, and the transmission medium are essentially invariant, the channel characteristics for the coefficients may be known. Alternatively, the coefficients may be calculated using relationships that define the network components. The channel characteristics may be determined in a training mode arrangement with the transmission of a training signal from a transmitting end to a receiving end that allows for determination of the channel response. The receiving end would transmit back to the transmitting end information regarding the channel response.

The formation of the prescribed feedback filter polynomial, B*(z), allows for the implementation of a feedback filter of lower power than the standard feedback polynomial B(z). This scheme provides for the presence of short interference up to the equalization at a receiving end. This small amount of interference provides increased gain at the receiving end. Further, the length of the channel response may be defined by the target polynomial F(z). In an embodiment, the length of the prescribed feedback polynomial, B*(z), may be equal to 100 or more. In addition to increasing the signal energy at the input of an equalizer at a receiving end and allowing the use of a MAP-detector after a precoder for better equalization, the implementation of prescribed response precoding scheme provides for selectable target length of the energy and shape of the overall impulse response at the receiving end. Such a prescribed response precoding scheme may be implemented in 10 Gigabit Ethernet schemes or in other communication oriented applications.

In an embodiment, a modified Map equalization may be implemented using offsets of signals introduced at a transmitter to the channel. Such offsets may be used in conjunction with an equivalent impulse response of the channel. The offsets may be determined using current and previous signals and channel characteristics known or determined in a training mode. These signals and characteristics may be used to determine an expected output signal value using a most likely transmitted signal sequence.

Figure 3:
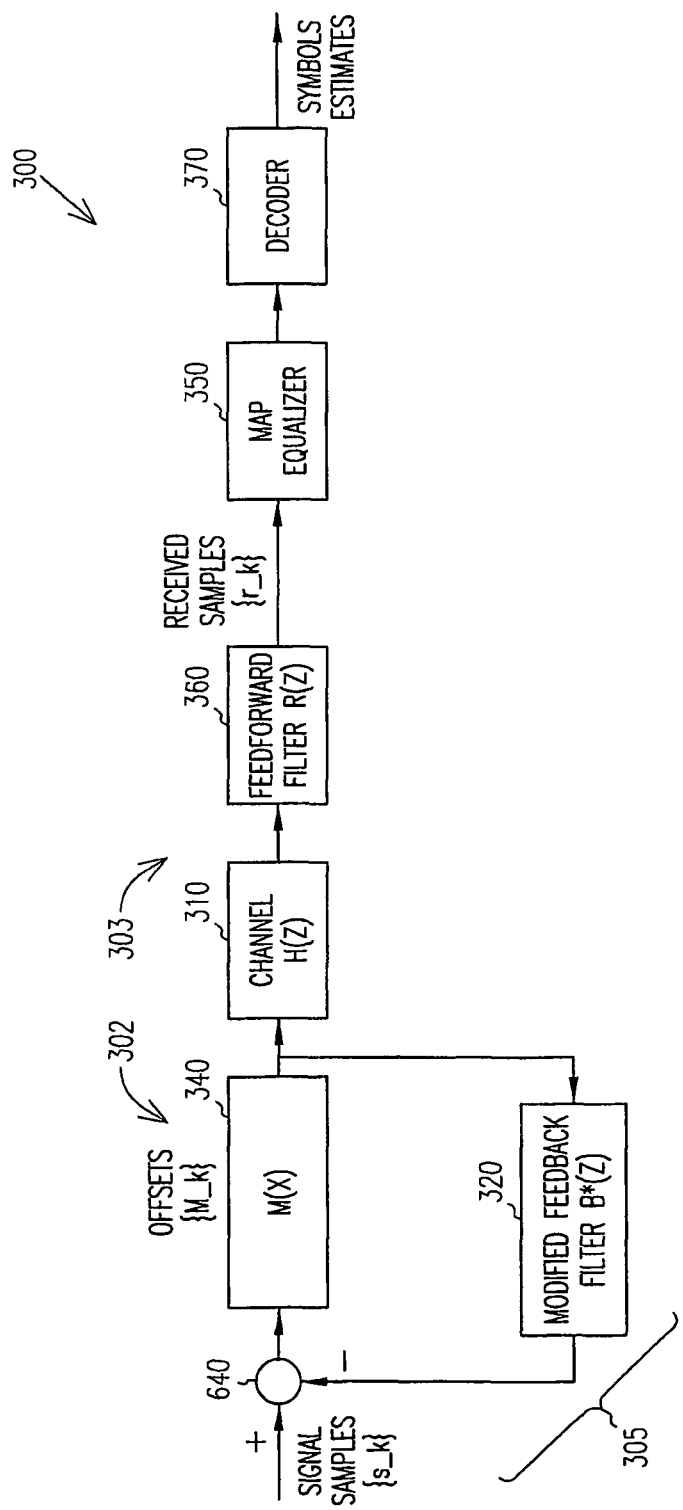
FIG. 3 depicts an embodiment of a network a including a channel, a precoder with a prescribed feedback filter, and a MAP equalizer, where the MAP equalizer is configured to use offsets introduced by a transmitter to the channel.

FIG. 3 depicts an embodiment of a network 300 including a channel 310 between node 302 and node 303, a precoder 305 with a prescribed feedback filter 320, and a MAP equalizer 350, where MAP equalizer 350 is configured to use offsets introduced by a transmitter to channel 310. Precoder 305 includes a mapping unit 340 to function with prescribed feedback filter 320. Prescribed feedback filter 320 may be a modified feedback filter 320 as in an embodiment implementing a modified THP. MAP equalizer 350 receives samples from a feedforward filter 360 and provides an output to a decoder 370. Decoder 370 may be a low density parity-check (LDPC) decoder. A MAP equalizer, such as MAP equalizer 350, may be used in one or more systems at a receive end of network 300. A precoder, such as precoder 305, may be used in one or more systems at a transmit end of network 300. Embodiments of MAP equalizers and precoders may be used implemented in systems for bidirectional communication in network 300.

In an embodiment, MAP equalizer 350 may be used with precoder 305 configured as an embodiment of a modified Tomlinson-Harashima precoder. MAP equalizer may be realized as a MAP equalizer that uses an optimum-soft-output algorithm (OSA), in which the MAP equalizer is modified to correlate to a modified Tomlinson-Harashima precoder. MAP equalization using OSA is known to those skilled in the art. See, Li, Vucetic, and Sato, "Optimum Soft-Output Detection For Channels With Intersymbol Interference," *IEEE Transactions On Information Theory*, 41(3), pp. 704-713, May 1995. MAP equalization using OSA may be described as a finite-state machine which may be illustrated by a trellis diagram.

In an embodiment as shown in FIG. 3, a polynomial B(z) represents a standard feedback filter polynomial for a standard precoder at the transmit end of channel 310, which is related to a feedforward filter 360 at the receive end of channel by B(z)=H(z) R(z). In an embodiment, a modified feedback filter 320 at the transmit end may have a modified polynomial given by B*(z)=B(z)/F(z). A target polynomial F(z) may be a prescribed polynomial of a small power, with the constraint that the feedback polynomial B(z) should be divided by the polynomial F(z). For any nontrivial polynomial F(z), i.e. F(z)≠1, the output, {$r_k$}, of the feedforward filter 360 has the form $$r_k = \sum_{i=0}^{L_f} (s_{k-i} + M_{k-i})f_i + n_k$$

where $s_k$ represents a signal transmitted at time instant k, $M_k$ is the corresponding modular offset, $f_i$, i=0 ... $L_f$, are the equivalent impulse response F(z) samples, $L_f$ denotes degree of F(z), and $n_k$ is the sample of an additive white Gaussian noise (AWGN) channel at time instant k. Offsets {$M_k$} are introduced by nonlinear device M(x) 340 at a transmitter to compensate possible signal instability after application of modified feedback filter 320. The modular offset $M_k$ comprises the product of the modulo M and a random integer which is completely determined by signals $s_k, \ldots, s_1$.

The occurrence of the modular offset does not allow using a standard MAP equalization technique, because modular offset is random and the number of possible signal sequences is infinite. An embodiment of a modified MAP equalizer based on prediction of the offsets during MAP equalization process provides an approach to address this problem.

In an embodiment of such a MAP equalization process, at a time instant k for every state $x_k$, a signal sequence, which most likely leads to this state, may be stored in memory. For this signal sequence, operations similar to those conducted at a transmit side to construct a precoder with a prescribed response as discussed with respect to a method related to FIG. 2, may be performed. Such operations may be used to determine the offset $M_k$ introduced by modular device at the transmit end. For an essentially invariant transmission medium, such as a wire line network, the channel characteristics may be known to approximate each offset, calculated using relationships that define the network components. The channel characteristics may be determined in a training mode arrangement with the transmission of a training signal from a transmitting end to a receiving end that allows for determination of the offset. The receiving end would transmit back to the transmitting end information regarding the channel response.

Given the offsets of current and some previous signals and known equivalent impulse response $\{f_i\}$, $i=0 \ldots L_f$, expected output signal value $y(\xi_k)$ for every branch (or transition)=$\xi_k$= $(x_k, x_{k+1})$ may be calculated as $$y(\xi_k) = \sum_{i=1}^{L_f} (s_{k-i} + M_{k-i}) f_i$$

In this embodiment, the factors $M_{k-i}$ and hence $M_{k-i} f_i$, are due to the modified THP. In an embodiment, the inclusion of these factors is implemented in a normal OSA MAP algorithm. In an OSA MAP algorithm, a multiplicative branch metric, $m_m(\xi_k) = m_m(x_k, x_{k+1})$, is defined in terms of branch $\xi_k$ and is dependent on the a priori probability $P(x_{k+1}|x_k)$ and received samples $r_k$. The term, $m_m(\xi_k)$, may be defined as $$m_m(\xi_k) = \rho(r_k - y(\xi_k)) P(x_{k+1}|x_k),$$

where $y(\xi_k)$ is a noiseless output of branch $\xi_k$ and $\rho$ is the probability density function of the noise. An additional metric, $\alpha(x_k, x_{k+1})$, may be formed in terms of the probability $p(x_k, r^{k-1})$ and the multiplicative branch $m_m(x_k, x_{k+1})$ as $$\alpha(x_k, x_{k+1}) = p(x_k, r^{k-1}) m_m(x_k, x_{k+1}),$$

where $r^{k-1}$ are received signals from time 1 to time k−1. Such metrics may be recursively obtained from previous estimates in a OSA process. In the OSA MAP algorithm, the most likely signal sequence leading to a current state is chosen. The rule for making the choice is based on a metric $\alpha(x_k, x_{k+1})$ comparison. The stored signal sequence for path with largest value of $\alpha(x_k, x_{k+1})$ leading from state $x_k$ to state $x_{k+1}$ is extended with symbol $s_{k+1}$ uniquely determined by $(x_k, x_{k+1})$ pair. Such sequence becomes the most likely transmitted sequence for state $x_{k+1}$).

Figure 4:
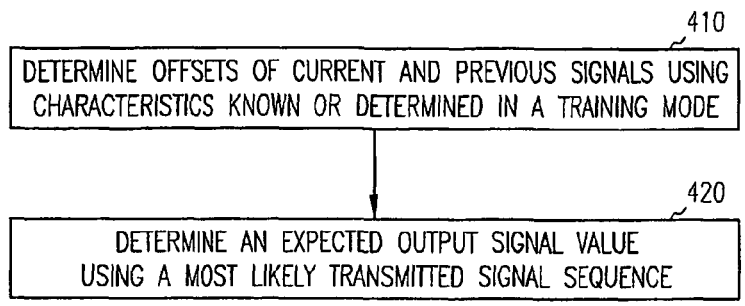
FIG. 4 shows features of an embodiment of a method to provide a MAP equalization scheme using offsets from a transmit end of a communication channel.

FIG. 4 shows features of an embodiment of a method to provide a MAP equalization scheme using offsets from a transmit end of a communication channel. At 410, offsets of current and previous signals are determined. The offsets may be calculated using known channel characteristics or determined in a training mode. At 420, an expected output signal value using a most likely transmitted signal sequence is determined for each of various states at times in the transmission. The offsets are included in the determination of the expected output signal value. In an embodiment, a method is implemented as a modified MAP equalization process using a optimum-soft-output algorithm.

Figure 5:
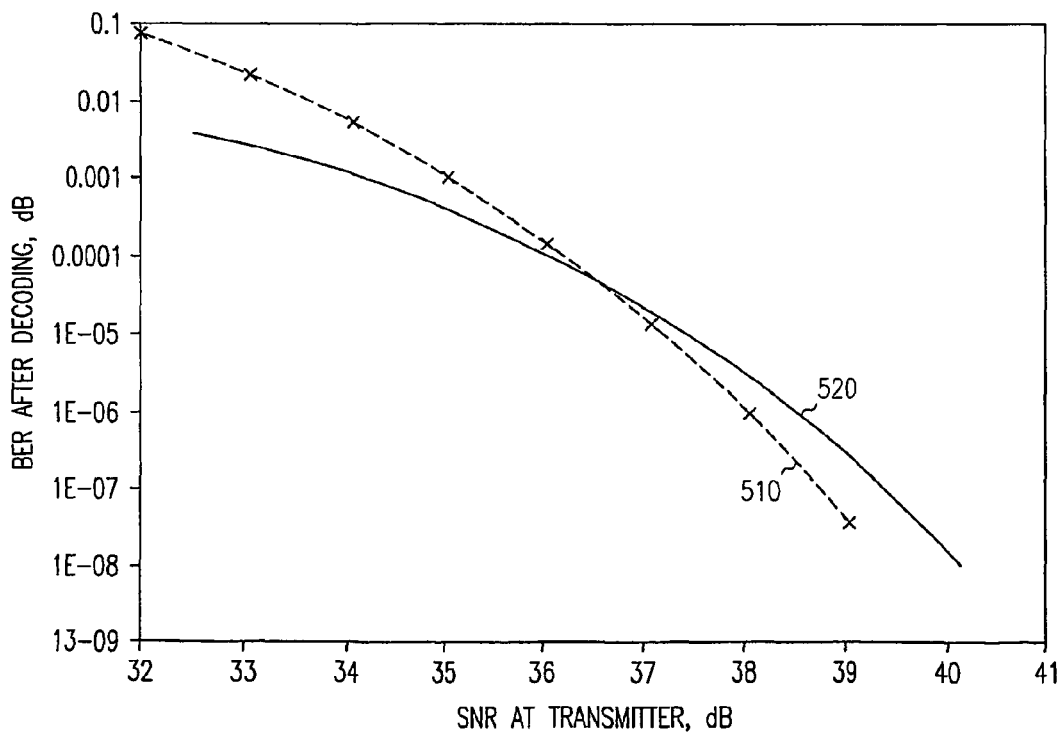
FIG. 5 illustrates a performance of an embodiment of a modified MAP equalizer/modified Tomlinson-Harashima precoder scheme as compared with a classical Tomlinson-Harashima precoder scheme.

FIG. 5 illustrates a performance of an embodiment of a modified MAP equalizer/modified Tomlinson-Harashima precoder scheme 510 as compared with a classical Tomlinson-Harashima precoder scheme 520. A bit error rate, BER, versus SNR is shown in the comparison of FIG. 5 for a progressive edge-growth LDPC code construction, PEG (1024, 512), having a code length of 1048 and a message length of 512 coded using pulse amplitude modulation (PAM) signaling with a PAM-2 signaling format. In this embodiment, a target polynomial $F(z)=1.17+1.65z+0.78z^2$ is used for a UTP Cat 7 (Unshielded Twisted Pair Category 7) transmission. FIG. 5 shows that, at high SNR values, the modified MAP equalization with the modified THP outperforms the classical THP. Embodiments of a MAP equalization scheme using offsets at a transmit end of a communication channel may be implemented in 10 Gigabit Ethernet schemes or in other high speed communication-oriented applications.

In an embodiment, a channel precoder is constructed as an average precoder based on approximation of channel responses for a range of channel lengths. The average precoder may be constructed as a Tomlinson-Harashima precoder having an average feedback filter determined from a set of feedback filters for a range of cable lengths. The feedback filter for the average precoder may be construction based on a target function that includes a weighted sum of signal-to-noise ratios related to the range of channel lengths and a weighted sum related to differences between coefficients of an infinite impulse response filter and coefficients of a finite response filter. In an embodiment, a modified THP may be generated from a Tomlinson-Harashima precoder having an average feedback filter based on a range of channel lengths. In addition, a modified MAP equalizer may be generated to correspond to the modified THP.

Tomlinson-Harashima precoder is to be the part of an Institute of Electrical and Electronics Engineers (IEEE) standard, IEEE 802.3an standard. In a draft, Draft P802.3an/D2.1, of IEEE standard Ethernet 802.3an for 10 GBASE-T having a formal expiration date of 21 Jul. 2005, use of a fixed set of Tomlinson-Harashima precoders for channel equalization during transmission over cables of different lengths is indicated. The dimension of the precoder set is not defined, but the range is approximately from 4 to 8 fixed precoders. This means that, during initialization, network cards for 10 GBASE-T may estimate the channel, but the precoders may not be constructed using the channel estimate. The precoders will be selected as the one of the predefined set of the precoders. The selection of precoders that provide the best possible signal-to-noise ratios over all cable lengths that are adapted to be used in 10 Gigabit Ethernet may be of particular interest.

To compare different precoders, a SNR criteria may be used to analyze the quality of a fixed set of precoders that will be used for the given range of cable lengths. A fixed precoder can be determined as an optimum precoder constructed for a length equal to the middle of a given range. However, unless this range is small, an unacceptable SNR degradation may occur near the start of the range and near the end of the range.

In an embodiment, a precoder construction uses an approximation of the channel responses for different lengths within a given range of lengths. As a result, a precoder constructed as a average precoder based on channel responses for different lengths may provide better quality over the whole range than a fixed precoder constructed for one length. The SNR for an embodiment of precoder using approximations over an entire range of channel lengths may avoid catastrophic degradation at the starting and the ending points of the range.

Figure 6:
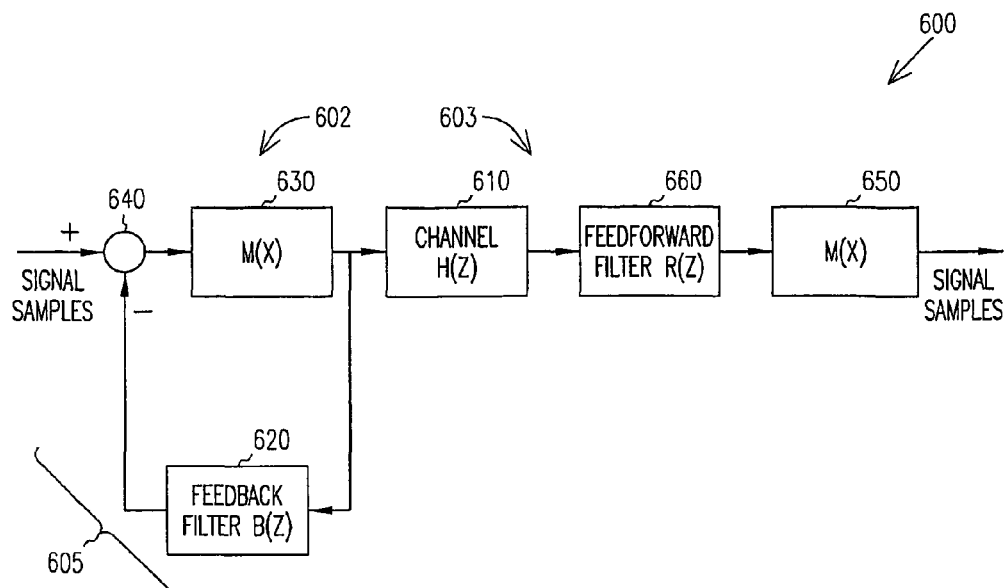
FIG. 6 illustrates a network that includes an embodiment of a precoder configured based on characteristics of Tomlinson-Harashima precoders over a range of channel lengths.

FIG. 6 illustrates a network 600 that includes an embodiment of a precoder 605 configured based on characteristics of Tomlinson-Harashima precoders over a range of channel lengths. Tomlinson-Harashima precoding provides for implementation of a feedback filter at the transmitter end of the communication channel with a mechanism to limit output signal amplitude. Signal samples to be transmitted in channel 610 between node 602 and node 603 are subjected to a feedback filter 620 defined by a polynomial B(Z) and a modulo reduction function, M(x), 630 to avoid overflowing the signal bounds. Modulo reduction function 630 is a modulo operation to limit the amplitude of the signals to be transmitted into channel 610. The feedback loop is closed with feedback filter 620 coupled back to a summer 640 that receives the signal samples. At the receive end of the communication channel, a feedforward filter 660 defined by polynomial R(z) receives the transmitted symbols and provides a filtered signal to a receive modulo reduction function 650 that maps the signal to symbol estimates in an operation effectively inverse to map reduction function 630.

A universal precoder set may be built by building a precoder for each cable length in a set of cable lengths precoders, where the required SNR for each precoder is equal to or greater that the SNR for a precoder for a given arbitrary cable length. In an embodiment, a precoder construction is directed to maximizing SNR for a region of cable lengths rather than a set of points. In contrast to measuring a channel impulse response and optimally tuning precoder filters before transmission for this response, an embodiment for precoder construction provides a set of THP filters coefficients for all transmission conditions in the range of cable lengths.

In a classical THP scheme for a given channel length, feedforward R(z) and feedback B(z) precoder filters are chosen to minimize MSE at precoder output given some channel impulse response H(z). M(x) denotes the modulo operator, which for the case of M-PAM with signal distance d is given by $$M(x) = x - Md \left\lfloor \frac{x + \frac{Md}{2}}{Md} \right\rfloor$$

In order to reduce the amount of computations during transmission, precoder filters may be pre-computed and stored in table. The task of choosing a fixed set of precoder filters involves an optimization process. Such set should be suitable to maintain transmission quality at desired level for varying cable lengths. In an embodiment, the optimization target function for measuring the quality of fixed THP sets may be chosen as a sum of precoder SNR values for some set of cable lengths, e.g. for all lengths between 0 and 100 m taken every 5 m. Embodiments are not limited to a range between 0 and 100 m with a sampling length of 5 m. Various embodiments may use different ranges for cable lengths and different sampling lengths.

Filters can be specified as infinite impulse response (IIR) or finite impulse response (FIR) filters. In an embodiment, a goal is to determine a set of precoders that provides acceptable operating characteristics over a range of cable lengths despite the fact that there exists a channel impulse response mismatch with respect to the impulse response for which the precoders were designed. To build such a set, valid channel impulse responses should be supplied for different channel models. Channel measurements may be made of for a number of cables with different lengths, if published channel measurements are not available.

In an embodiment, a set of optimal precoders for a fixed number of intermediate cable lengths in a range of lengths may be built with this set evaluated as to whether this set is sufficient to provide a required SNR level at a decision point for an arbitrary cable length. In an embodiment, a set of optimal precoders for a fixed number of intermediate cable lengths between 0 and 100 meters may be built. A decision point for the SNR after a precoder can be computed as $$SNR(L, L') = \frac{v_0^2}{\sigma_i^2 + \sigma_w^2}$$

where $v_0$, in volts, is the $(K_f+1)^{th}$ sample of precoder impulse response (IR) and $K_f$ is precoder decision delay. $v_o$ (V) may be computed as a convolution of feedback filter, channel filter, and feedforward filter impulse responses with $V(z)=B^{-1}(z)*H(z)*R(z)$. Precoder feedback B(z) and feedforward F(z) filters may be constructed using channel IR for cable length L, while H(z) is the channel IR for L' cable length. $v_0$ carries signal energy after TH precoding. The interference noise may be represented by $\sigma_i^2$, which may be computed as $$\sigma_i^2 = \sum_{-\infty}^{-1} v_i^2 + \sum_{1}^{\infty} v_i^2$$

As seen from this relationship, interference noise is the energy of all samples of precoder impulse response V except the $0^{th}$. In addition, $\sigma_w^2$ denotes the energy of white noise increased by precoder feedforward filter $\{r_i\}$, i=0 ... $K_f$, a gain factor with respect to a AWGN channel, $$\sigma_w^2 = \sigma_{awgn}^2 \sum_{i=0}^{K_f} r_i^2.$$

With a relatively accurate channel model or channel measurements for sufficient number of cable lengths, a set of fixed TH precoders may be provided that on average provide good performance. In an embodiment, a set of feedback filters for some range of cable lengths can be built from which an average THP filter may computed. Then, the average THP filter may be implemented for equalization for all cable lengths in the selected range.

Figure 7:
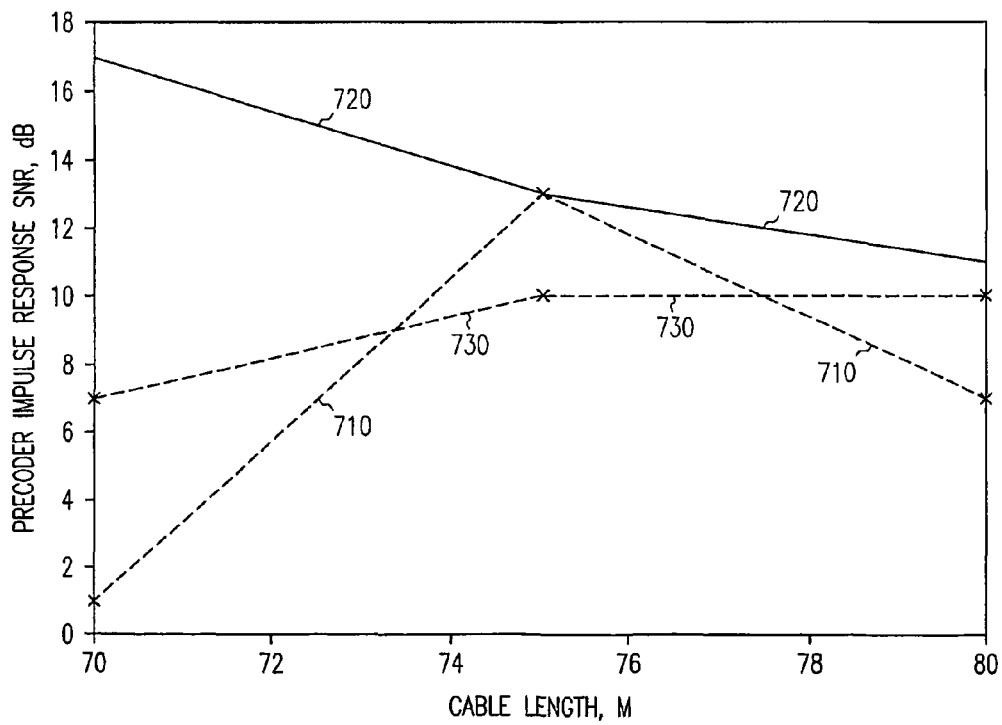
FIG. 7 illustrates an embodiment of a precoder having an average filter in comparison with a fixed 75 m optimal filter.

FIG. 7 illustrates an embodiment of a precoder having an average filter in comparison with a fixed 75 m optimal filter. In FIG. 7, the SNR after a precoder is shown as a function of cable length over a range from 70 meters to 80 meters. Curve 710 is the performance of a precoder constructed for optimal performance at 75 m. Precoder having performance curve 710 shows a SNR of about 1 dB at 70 meters, which is about 17 dB lower than optimum. Curve 720 represents SNRs for a set of precoders with IR of cable models of various lengths. Curve 730 shows the performance for a precoder having an averaged THP filter. The SNR for the precoder using averaged filters (curve 730) is less than the SNR for set of precoders (curve 720), each built for a specific length in the 70-80 m range. However, the precoder using average filters (curve 730) may provide acceptable performance for the whole range of lengths, with its best performance for the cable length close to 75 meters. The SNR for the precoder using averaged filters (curve 730) does not undergo the catastrophic SNR degradation at the ends of the range as does the optimal precoder of fixed 75 m filter lengths region (curve 710). Thus, over the selected 70-80 meter range, the SNR performance of the fixed precoder using average filters for this cable length range is better than the performance using a fixed 75 m precoder filter.

In an embodiment, a recursive IIR filter polynomial may be constructed as an ARMA (autoregressive moving-average) model of a FIR precoder feedback filter B(z) to generate a precoder over a range of cable lengths. ARMA models are known by those skilled in the art. With the recursive IIR filter polynomial given as $$\hat{B}(z) \approx \frac{N(z)}{D(z)}$$

and the FIR precoder feedback filter polynomial given as B(z), a minimization criteria may be provided by target function $$TF = \sum_{i=0}^{K_b} (b_i - \hat{b}_i)^2$$

where $b_i$ and $\hat{b}_i$ are respective coefficients of B(z) and $\hat{B}(z)$ approximation polynomials. An ARMA model of fixed FIR precoder filters can be built to obtain higher computation efficiency, because they have a significantly smaller number of coefficients to represent the IR of a precoder feedback filter. In an embodiment, this target function can be modified to maximize a sum of SNRs for some cable lengths $\{L_i\}$ that are close to the length for which B(z) filter was designed. This modified target function may be generated as $$TF = W_1 \sum_{i=0}^{K_b} (b_i - \hat{b}_i)^2 + W_2 \sum_{\{L_i\}} SNR(L, L_i)$$

where $W_1$ and $W_2$ are weighting coefficients. The resulting ARMA model of FIR feedback precoder filter may provide acceptable SNR for not only one cable length, but for a range of cable lengths. Such optimization may be considered as a generalization of using average FIR precoder filters approach.

Precoders configured in accordance with various embodiments may provide Tomlinson-Harashima precoders constructed for a range of cable lengths. Embodiments for selecting the precoder for the given range of the cable lengths may provide a means to increase the average SNR over the whole range. Such precoders may be implemented with an absence of catastrophic SNR degradation at the ends of the range of cable lengths. Further, various embodiments may provide for reduced computation and reduced use of storage memory during transmission due to the use of IIR filters.

Figure 8:
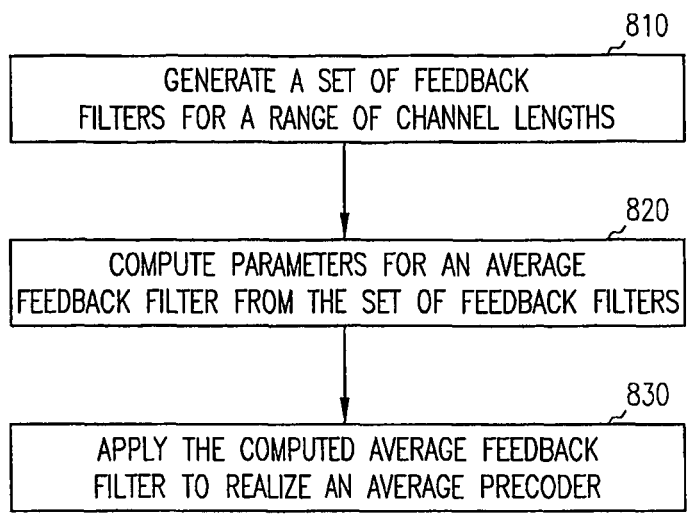
FIG. 8 shows features of an embodiment of a method to construct a precoder for a range of channel lengths.

FIG. 8 shows features of an embodiment of a method to construct a precoder for a range of channel lengths. At 810, a set of feedback filters for a range of channel lengths is generated. At 820, parameters for an average feedback filter from the set of feedback filters are computed. At 830, the computed average feedback filter is applied to realize an average precoder. In an embodiment, an effective average precoder may be constructed by generating a feedback filter for the effective average precoder using a target function that includes a weighted sum of signal-to-noise ratios related to the range of channel lengths and a weighted sum related to differences between coefficients of an infinite impulse response filter and coefficients of a finite response filter. The target function may be a minimization criteria.

Network 300 of FIG. 3 and network 600 of FIG. 6 may include other apparatus and systems for communicating between network nodes 302 and 303 and between network nodes 602 and 603. However, these additional features are not shown to focus on features of the various embodiments discussed herein. Each node may receive and transmit information. Network nodes may each include a number of systems that may effectively be coupled to a precoder as in FIGS. 3 and 6, and to MAP equalizer as in FIG. 3 to communicate over channels 310, 610. Systems at these nodes may provide one or more functions at a node. A nodal system may direct operations of other systems and/or apparatus at the node. Systems at each network node (302, 303) and (602, 603) may include external connections to each other that are wired or wireless. In an embodiment, nodal systems may be realized as a switch, a router, a computer, a server, or combination of these elements. Further, nodal systems may couple to each other or other apparatus at a node over a medium that is compatible with Peripheral Component Interconnect (PCI) or with PCI express.

The network nodes (302, 303) and (602, 603) each may represent processing systems having a physical layer (PHY) entity arranged to operate in accordance with 10GBase-T as defined by the IEEE 802.3an series of standards, for example. The 10GBase-T PHY may interface with, for example, a 10G media access control (MAC) and Gigabit Media Independent Interface (XGMII) in the IEEE architecture. The 10GBase-T PHY may include part of a network interface card (NIC), for example. Nodes (302, 303) and (602, 603) may include any processing system and/or communications device suitable for use with a 10 GBase-T device. For example, node pair (302, 303) and node pair (602, 603) may be implemented as a pair of switches, a pair of routers, a pair of servers, a switch and a router, a switch and a server, a server and a router, and so forth. In addition, nodes (302, 303) and nodes (602, 603) also may be part of a modular system in which 10 GBase-T is the high-speed connection for the system. Further, examples for nodes (302, 303) and nodes (602, 603) may include high-end servers, supercomputers, clusters, grid computing, workgroup switch uplinks, aggregation uplinks, storage systems, and so forth. The embodiments are not limited in this context.

Various embodiments or combination of embodiments for apparatus and methods for constructing parameters associated with a precoder to a channel may be realized in hardware implementations, software implementations, and combinations of hardware and software implementations. Constructing parameters associated with a precoder to a channel may include applying a maximum a posteriori probability (MAP) equalization using offsets of signals introduced at a transmit end of the channel or constructing a channel precoder based on using approximation of channel responses for a range of channel lengths. These implementations may include a computer-readable medium having computer-executable instructions for performing various embodiments similar to embodiments discussed herein. The computer-readable medium is not limited to any one type of medium. The computer-readable medium used will depend on the application using an embodiment.

Figure 9:
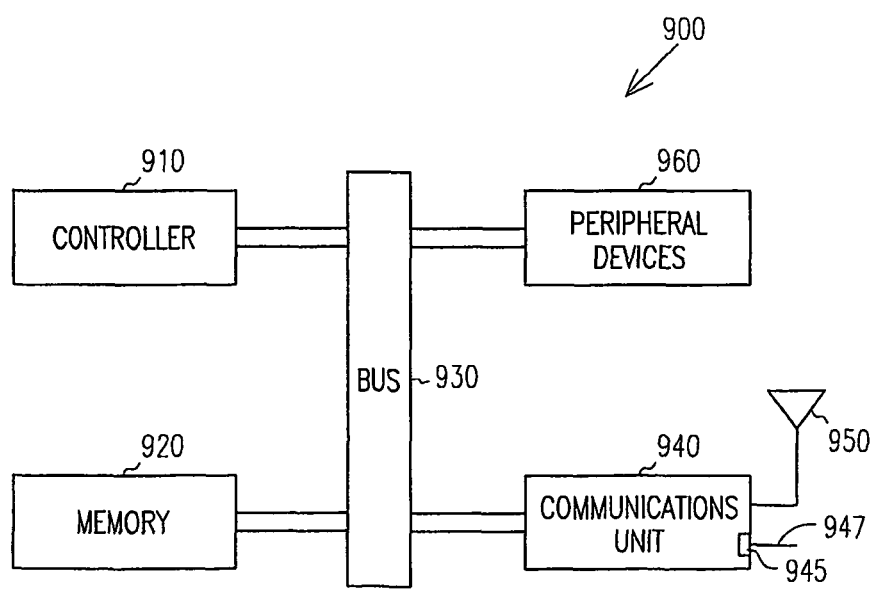
FIG. 9 illustrates a block diagram of an embodiment of a system having an embodiment of a precoder-associated unit, where the precoder-associated unit may include an equalizer adapted to apply a maximum a posteriori probability equalization using offsets of signals introduced at a transmit end of a channel or a precoder feedback filter with filter coefficients based on an approximation of channel responses for a range of channel lengths.

FIG. 9 illustrates a block diagram of an embodiment of a system 900 having an embodiment of a precoder-associated unit. The precoder-associated unit may include an equalizer adapted to apply a maximum a posteriori probability equalization using offsets of signals introduced at a transmit end of a channel. The precoder-associated unit may include a precoder feedback filter with filter coefficients based on an approximation of channel responses for a range of channel lengths. System 900 includes a controller 910, a memory 920, and a bus 930, where bus 930 provides electrical connectivity between controller 910 and memory 920 and between controller 910 and a communication unit 940. Bus 930 may be a parallel bus. Bus 930 may be a serial bus. Communication unit 940 may include an embodiment of a modified MAP scheme similar to the schemes discussed with respect to FIGS. 1-4, an embodiment of a precoder for a range of channel lengths similar to the schemes discussed with respect to FIGS. 5-8, or combinations of these embodiments. Communication unit 940 may couple to a wired network or a wireless network. Alternatively, communication unit 940 may include a network interface to couple to a wired network and to a wireless network. A wired network may include a network having wire channels, fiber optic channels, and/or co-axial channels.

An embodiment may include an additional peripheral device or devices 960 coupled to bus 930. Bus 930 may be compatible with PCI or with PCI express. In an embodiment, communication unit 940 may include a network interface card. In an embodiment, communication unit 940 may include a communications device suitable for use with a 10 GBase-T device. Communication unit 940 may include a connection 945 to a wired network. Connection 945 may be configured to connect to a cable 947. Connection 945 may be configured to connect to an unshielded twisted pair cable. Connection 945 may be configured to connect to a shielded twisted pair cable. In a wireless embodiment, communication unit 940 may be coupled to an antenna 950. In an embodiment, antenna 950 may be a substantially omnidirectional antenna. System 900 may include, but is not limited to, information handling devices, wireless systems, telecommunication systems, fiber optic systems, electro-optic systems, and computers.

In an embodiment, controller 910 is a processor. Memory 920 may include any form of computer-readable medium that has computer executable instructions to apply a MAP equalization using offsets of signals introduced at a transmit end of a channel, to construct a channel precoder based on using approximation of channel responses for a range of channel lengths, or both. Peripheral devices 960 may also include displays, additional storage memory, or other control devices that may operate in conjunction with controller 910. Alternatively, peripheral devices 960 may include displays, additional storage memory, or other control devices that may operate in conjunction with controller 910, communication unit 940, and/or memory 920.

In a wireless application, the channel characteristics may be continually updated at a transmitting section of communication unit 940 in system 900 so that a standard feedback polynomial B(z) may be determined. Once B(z) is known, a prescribed feedback polynomial, B*(z) may be determined, a prescribed feedback filter realized, and a MAP equalization scheme realized in accordance with various embodiments. These channel characteristics may be provided as status information from a receiver at the receiving end of the wireless channel over information feedback channels. Use of these information feedback channels provides for an adaptive prescribed response precoding/MAP equalization scheme. Further, in a wireless arrangement in which the transmission medium is relatively steady or slowly varying, the channel characteristics may be determined in a manner similar to a wire line network.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. A method comprising:
    constructing a channel precoder as an average precoder based on using approximation of channel responses for a range of channel lengths; and
    generating a feedback filter for the average precoder using a target function that includes a weighted sum of signal-to-noise ratios related to the range of channel lengths and weighted sum related to differences between coefficients of an infinite impulse response filter and coefficients of a finite response filter.

2. A non-transitory computer-readable medium that stores instructions, which when performed by a machine, cause the machine to:
    construct a channel precoder as an average precoder based on using approximation of channel responses for a range of channel lengths; and
    generate a feedback filter for the average precoder using a target function that includes a weighted sum of signal-to-noise ratios related to the range of channel lengths and a weighted sum related to differences in of an infinite impulse response filter and coefficients of a finite response filter.

3. An apparatus comprising:
    a communications unit to transmit a signal into a channel;
    a precoder-associated unit disposed in the communications unit, the precoder-associated unit including a precoder feedback filter with filter coefficients based on an approximation of channel responses for a range of channel, lengths; and
    wherein the filter coefficients include filter coefficients based on a minimization target function that includes a weighted sum of signal-to-noise ratios related to the range of channel lengths and a weighted sum related to differences between coefficients of an infinite impulse response filter and coefficients of a finite response filter.

4. A system comprising:
    a cable;
    a precoder-associated unit communicatively coupled to the cable, the precoder-associated unit including a precoder feedback filter with filter coefficients based on an approximation of channel responses for a range of channel lengths;
    a processor communicatively coupled to the precoder-associated unit;
    a parallel bus; and
    a memory coupled to the processor through the parallel bus; and
    wherein the filter coefficients include filter coefficients based on a minimization target function that includes a weighted sum of signal-to-noise ratios related to the range of channel lengths and a weighted sum related to differences in of an infinite impulse response filter and coefficients of a finite response filter.

* * * * *

UNITED STATES PATENT AND TRADEMARK OFFICE
CERTIFICATE OF CORRECTION

PATENT NO.        : 8,681,849 B2
APPLICATION NO.   : 11/988148
DATED             : March 25, 2014
INVENTOR(S)       : Taubin et al Page 1 of 1

It is certified that error appears in the above-identified patent and that said Letters Patent is hereby corrected as shown below:

In the Claims

Column 14, line 39-40, in Claim 3, delete "channel," and insert --channel--, therefor Signed and Sealed this
Eighteenth Day of November, 2014

Michelle K. Lee
*Deputy Director of the United States Patent and Trademark Office*